US008832280B2

(12) United States Patent
Moore et al.

(10) Patent No.: US 8,832,280 B2
(45) Date of Patent: Sep. 9, 2014

(54) INTERACTIVE CONNECTIVITY ESTABLISHMENT FOR NON-ENABLED ENDPOINTS

(75) Inventors: Tim M Moore, Bellevue, WA (US); Danny Levin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1156 days.

(21) Appl. No.: 11/771,555

(22) Filed: Jun. 29, 2007

(65) Prior Publication Data
US 2009/0006633 A1 Jan. 1, 2009

(51) Int. Cl.
G06F 15/16 (2006.01)
H04L 12/66 (2006.01)
H04L 29/06 (2006.01)

(52) U.S. Cl.
CPC ........ *H04L 65/1069* (2013.01); *H04L 65/1006* (2013.01)
USPC ............................. 709/228; 709/203; 370/352

(58) Field of Classification Search
CPC ............ H04L 61/2589; H04L 65/1069; H04L 67/303; H04L 65/1006
USPC ............................. 709/228, 227, 203; 370/352
See application file for complete search history.

(56) References Cited

U.S. PATENT DOCUMENTS

| 7,065,043 | B2 | 6/2006 | Wu et al. |
| 7,082,122 | B2 | 7/2006 | Pan |
| 7,085,829 | B2 | 8/2006 | Wu et al. |
| 2002/0186685 | A1 | 12/2002 | O'Brien, Jr. et al. |
| 2003/0033418 | A1 | 2/2003 | Young et al. |
| 2004/0090954 | A1 | 5/2004 | Zhang et al. |
| 2005/0027861 | A1 | 2/2005 | Shah et al. |
| 2005/0207413 | A1* | 9/2005 | Lerner .......................... 370/389 |
| 2005/0281274 | A1 | 12/2005 | Fukui |
| 2006/0218283 | A1 | 9/2006 | Jones et al. |
| 2006/0251052 | A1 | 11/2006 | Croak et al. |
| 2006/0287929 | A1 | 12/2006 | Bae et al. |
| 2007/0002829 | A1* | 1/2007 | Chang et al. .................. 370/352 |
| 2007/0019619 | A1* | 1/2007 | Foster et al. .................. 370/352 |
| 2007/0076729 | A1* | 4/2007 | Takeda .......................... 370/401 |
| 2007/0253418 | A1* | 11/2007 | Shiri et al. .................... 370/392 |
| 2008/0080525 | A1* | 4/2008 | Chatilov et al. ............... 370/401 |
| 2008/0126541 | A1* | 5/2008 | Rosenberg et al. ........... 709/225 |

OTHER PUBLICATIONS

Robert Sparks, SIP Basics and Beyond, Mar. 2007, ACM 1542-7730/07/0300, pp. 24 and 30.*
Ahuja, et al., VOIP: What is it Good for?, available at least as early as Feb. 9, 2007, at <<http://delivery.acm.org/10.1145/1030000/1028897/ahuja.pdf?key1=1028897&key2=8541101711&coll=ACM&dl=ACM&CFID=75919783&CFTOKEN=92791909>>, ACM, 2004, pp. 1-8.

(Continued)

Primary Examiner — Viet Vu
Assistant Examiner — Herman Belcher
(74) Attorney, Agent, or Firm — Andrew Smith; Jim Ross; Micky Minhas

(57) ABSTRACT

Procedures for commanding a media relay to direct interactive connectivity establishment (ICE) communications are discussed. In an implementation, a back-to-back user agent may issue a command changing the state of the media relay so that communications initially routed through the back-to-back user agent may be routed to a non-ICE device.

18 Claims, 3 Drawing Sheets

(56) References Cited

OTHER PUBLICATIONS

"LanScape VOIP Media Proxy Server Release 2.72 (RTP Media Proxy for Voice, video and data collaboration)", available at least as realy as Feb. 9, 2007, at <<http://www.lanscapecorp.com/ProductPages/VoipMediaProxy.asp>>, LanScape Corporation, 1987-2007, pp. 1-3.

Stuedi, et al., "SymPhone: Design and Implementation of a VoIP peer for Symbian mobile phones using Bluetooth and SIP", available at least as early as Feb. 9, 2007, at <<http://delivery.acm.org/10.1145/1170000/1161034/p63-stuedi.pdf?key1=1161034&key2=6033101711&coll=GUIDE&dl=Guide&CFID=75919783&CFTOKEN=92791909>>, ACM, 2006, pp. 63-70.

Vilei, et al., "A New UPnP Architecture for Distributed Video Voice over IP", available at least as early as Feb. 9, 2007, at <<http://delivery.acm.org/10.1145/1190000/1186657/a2-vilei.pdf?key1=1186657&key2=0642101711&coll=ACM&dl=ACM&CFID=75919783&CFTOKEN=92791909>>, ACM, 2006, pp. 1-7.

* cited by examiner

INTERACTIVE CONNECTIVITY ESTABLISHMENT FOR NON-ENABLED ENDPOINTS

BACKGROUND

While firewalls prevent unauthorized access to devices within the firewall boundary, communications with a protected device may be problematic. Communication with a device in a network address translation (NAT) environment may be problematic as well. A NAT generally permits assigning private addresses to devices within the NAT. The NAT may allow private networks to grow while affording some protection as devices within the NAT boundary may not be reached from outside the NAT boundary because the private address, assigned in the NAT, may not be globally reachable.

Interactive connectivity establishment (ICE) may be used to facilitate communications with devices protected in the above manner. In implementations, ICE procedures may permit a target device to return a signaling device the port identification used by the signaling device. Using ICE, a target device may inform the device attempting to establish communication (i.e., the NAT protected device) from which port the original communication was received. In this manner, the device attempting communication may understand how the communication was routed.

Although ICE addresses issues related to traversing firewalls and NAT environments, some devices are not ICE capable and may not communicate with ICE devices. For example, non-ICE enabled devices may not signal an ICE device to establish communication or be capable of handling the available address "negotiation" associated with ICE and so on.

SUMMARY

Procedures for commanding a media relay to direct interactive connectivity establishment (ICE) communications are discussed. In an implementation, a back-to-back user agent may issue a command changing the state of the media relay so that communications initially routed through the back-to-back user agent may be routed to a non-ICE device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described to establish communications for non-ICE enabled devices (e.g., legacy devices). In implementations, a back-to-back user agent may command a media relay to direct communications from the back-to-back user agent to a non-ICE enabled device. Thus, communications may be established with a non-ICE device while traversing a NAT, a firewall or combinations thereof.

In further implementations, a back-to-back user agent device, including an ICE enabled user client, is configured to command a media relay to direct an ICE communication from the ICE user client to a non-ICE device. For example, while communication may initially flow through a back-to-back user agent device, the communication may be routed so that the content flows from the media relay to a non-ICE device. The back-to-back user agent device may command the media relay to communicate with the non-ICE device so that the back-to-back user agent device may not have to pass media content. In instances, the back-to-back user agent device command may override the non-ICE device so that the packets coming from the media relay are not discarded.

Exemplary Environment

Figure 1:
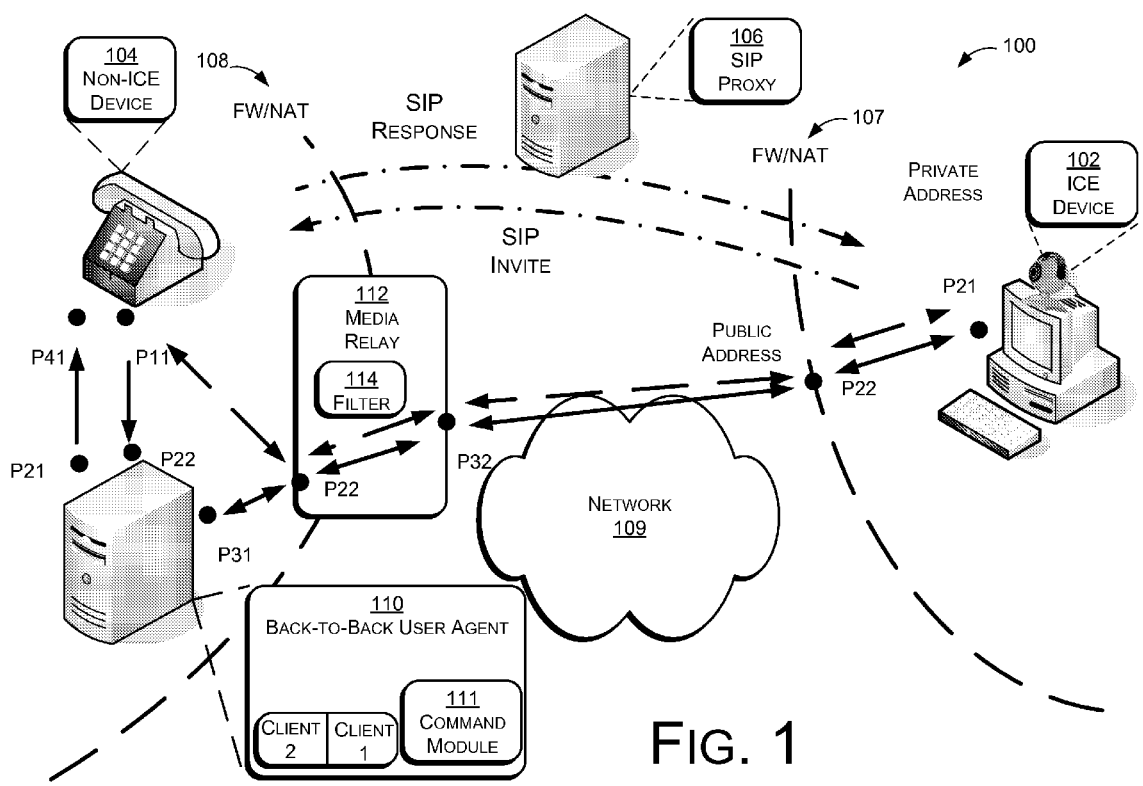
FIG. 1 illustrates an environment in an exemplary implementation that may use technologies to provide communication for non-ICE enabled devices.

FIG. 1 illustrates environment 100 in exemplary implementations that are operable to provide communication for non-ICE enabled devices. Components and techniques discussed herein may be used in conjunction with a wide variety of communication protocols. For example, session initiated protocol (SIP) may be used in conjunction with the implementations discussed herein. While a voice over internet protocol (VoIP) media session is discussed, other media sessions are suitable.

In the present implementations, a VoIP communication between an ICE enabled device (an ICE device 102) and a non-ICE device 104 (a legacy device not ICE enabled) may be initiated via a SIP procedure. In SIP, a "calling" device (the device initiating SIP communication) may send a SIP invite to a target device which may respond with a SIP reply for establishing communication between devices. The invite and/or reply may be sent via one or more SIP proxies. While a SIP proxy 106 is described, in implementations, multiple SIP proxies may be used when attempting to establish communication. The SIP proxy 106 may not participate in communicating media content. For instance, the SIP proxy 106 may transfer signaling information for establishing, modifying, terminating a session, and so on while content is passed via other intermediaries.

In implementations, the ICE device 102 and the non-ICE device 104 may be within one or more of a firewall boundary and/or a NAT boundary (e.g., firewall (FW) and/or NAT environments (with a FW/NAT boundary 107 encompassing the ICE device 102 and a FW/NAT boundary 108 encompassing the non-ICE device 104). In other situations, one or more of the device attempting communication may not be in a firewall or NAT environment. For example, a device may be available on a network 109 such as the Internet or World Wide Web, e.g., not "protected" by a firewall or NAT, such as a wireless laptop communicating on a public network 109 provided by a coffee shop.

ICE procedures may be used to establish communication between devices protected by firewalls, NAT schemas and so on. In the foregoing manner, ICE may traverse boundaries and facilitate communication. In the case of a firewall, ICE protocols may permit communication through the firewall boundary in order to establish a communication link. In a similar fashion, ICE may facilitate communication between one or more devices assigned a private (a non-globally reachable) address in a NAT schema. This is to say, that while a device may not be reached from a device on the "outside" of the NAT boundary, ICE may alleviate communication issues associate with NATs and firewalls.

Correspondingly, devices within a NAT scheme may be "unaware" of the public address for the communication port. For instance, a device included within a NAT may not be programmed with the public address for the NAT port through which the communication is flowing. Thus, while the NAT device may "know" the private outbound port address (i.e., the NAT address of the port) the device may not be programmed with the corresponding internet protocol (IP) address (globally reachable) for the port in question.

By way of example, the ICE device 102 may initiate communication by forwarding a SIP invite targeting the non-ICE device 104. In other instances, a non-ICE device may initiate communication, such as through a back-to-back user agent device 110. In the present example, the ICE device 102 may be protected by a NAT/firewall and the non-ICE device 104 may be within a NAT/firewall boundary as well. Other configurations and combinations are available. As part of SIP, the target device may return a reply for "negotiating" the communication parameters.

The initial ICE communications, used in conjunction with SIP signaling, may be directed from the ICE device 102 (port 21) through the NAT boundary (port 22) for the ICE device 102 and eventually to a media relay 112 straddling the NAT boundary for the target device (passing through port 31 to "port 22" on the inside of the NAT boundary). Parenthetical port numbers may generally refer to porting used to "spoof" the non-ICE end point (e.g., for NAT binding) such that, the non-ICE device 104 is configured as if the non-ICE device 104 were connected to the communicating device without the intervening devices. The communication may pass over a suitable network 109, such as the Internet or other network, to the media relay 112. Port numbers are included for exemplary purposes only, and port numbers may vary in different implementations.

The media relay 112 may forward or route communications through the NAT boundary. For example, the media relay may "port" communications from one side of the boundary to the other. Other port combinations and arrangements are available.

The ICE communication may be routed "through" a back-to-back user agent device 110 (also denominated as having "port 31"). For example, while the ICE communication is terminated at the back-to-back user agent, the back-to-back user agent may pass on the communication to the non-ICE device in a non-ICE manner. For instance, the communication may be routed to an ICE enabled client included in the back-to-back user agent device 110, which in-turn forwards the communication to a second client (which may be non-ICE), which may in-turn provide the communication to the non-ICE device 104 (via "port 22"). Thus, the back-to-back user agent device 110 may "negotiate" the port address for the ICE communication for non-ICE devices within the back-to-back user agent device 110 subnet. For example, an ICE candidate list may be carried inside session description protocol (SDP) which may be sent securely via SIP over transport layer security (TLS). This "negotiation" may establish a pair of ports from an ICE candidate list such as if a "hypothetical" communication was flowing between the back-to-back user agent device 110 and the ICE device 102. The back-to-back user agent device 110 may handle additional unrelated communications including additional clients and so on, in a similar manner. For example, the back-to-back user agent may terminate multiple ICE sessions for non-ICE devices and forward the communication on in a non-ICE communication.

The communication may pass through a second back-to-back user agent client (communicating with the first or ICE enabled client and the non-ICE client). The non-ICE device 104 may receive the communication via port 11. In this way, the back-to-back user agent device 110 may bridge between an ICE enabled communication (device passing an ICE communication) and a non-ICE device. The back-to-back user agent device 110 may permit NAT binding and terminate connectivity tests on behalf of the non-ICE device 104. For example, the ICE client may negotiate the ports for the communication. Initial communications may pass through the back-to-back user agent device 110 as well.

The back-to-back user agent device 110 may determine if the non-ICE device 104 may communicate without the back-to-back user agent device 110 apart from needing the media relay. For example, a command module 111 included in the back-to-back user agent device 110 may test whether the non-ICE device 104 may support non-ICE device 104-media relay 112 communication. For example, the back-to-back user agent device 110 may determine (such as based on non-ICE device input) that the non-ICE device 104 is capable of communicating with the media relay 112 (and other intermediate devices interposed in the and so on) for eventual communication to the ICE device.

At the end of ICE negotiation, the media relay may be "told" the media relay's normal communications port to communicate to, i.e. port 31. The media relay may then have state limiting the source and destination ports the media relay forwards to/from. In implementations, while the media relay 112 may be directed to forward communications to non-ICE device 104 port 11 (via "port 22") on the media relay 112, the media relay 112 communications may continue to flow to "port 31" on the back-to-back user agent device 110. This misdirection may occur because of the media relay state. For instance, the media relay 112 may forward content to the back-to-back user agent device 110 even though the non-ICE device 104 generated a SIP re-invite due to media relay state. The re-invite generally may offer to refresh a communication link over the communication path established using the ICE procedures (absent the back-to-back user agent device 110). In other implementations, media relay state may result in the media relay 112 continuing to forward content to the back-to-back user agent even though the media relay 112 has been directed to flow data to the non-ICE device 104.

The back-to-back user agent device 110 may overcome this state tendency, of the media relay 112 to misdirect communication in accordance with the last known status of the application, by issuing a command to force the media relay 112 to forward communication to the non-ICE device 104 (e.g., port 11) rather than to the ICE client included in the back-to-back user agent device 110 ("port 31"). For example, the command module 111 may command the media relay, if the non-ICE device 104 may communicate with the media relay 112. In this fashion, the back-to-back user agent device 110 may specify that the communication flow from the media relay 112 to the non-ICE device 104. When considering the situation from an ICE perspective, the back-to-back user agent device 110 may set the destination for the non-ICE device port. For instance, while ICE generally may establish send traffic ports, the back-to-back user agent may specify the non-ICE device port and dictate the non-ICE device port, in this case, port 11. In this fashion, while ICE permits various port combinations, the back-to-back user agent device 110 may specify the non-ICE device port while handling NAT binding, connectivity tests and so on, on behalf of the non-ICE device 104.

As a result of this command, the processing overhead for the back-to-back user agent device 110 may be minimized as subsequent content may not flow through the back-to-back user agent device 110. Moreover, the command may override the non-ICE device 104 to direct communications to the media relay 112. In other implementations, a second command may be used for the foregoing purpose. For example, while the non-ICE device 104 may be set to receive communications from the media relay 112, the state of the media relay 112 may prevent the desired arrangement. Correspondingly, if the media relay 112 is commanded to change routing, the command may override or cascade to the non-ICE device 104 so the non-ICE device 104 directs communications to the media relay 112. In embodiments, the command may be issued to direct the media relay 112 to forward content to the non-ICE device 104 without issuing a re-invite or the like direction.

The command may change or reset the media relay input filter 114 to accept communication packets from the non-ICE device 104. For example, the filter is reset to receive packets from the non-ICE device 104 instead of from the back-to-back user agent device 110. An input filter may reject inadvertent or unauthorized data. In the previous scenario, the filter may have rejected packets sent from devices, including the non-ICE device 104.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory.

The following discussion describes techniques that may be implemented using the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Exemplary Procedures

Figure 2:
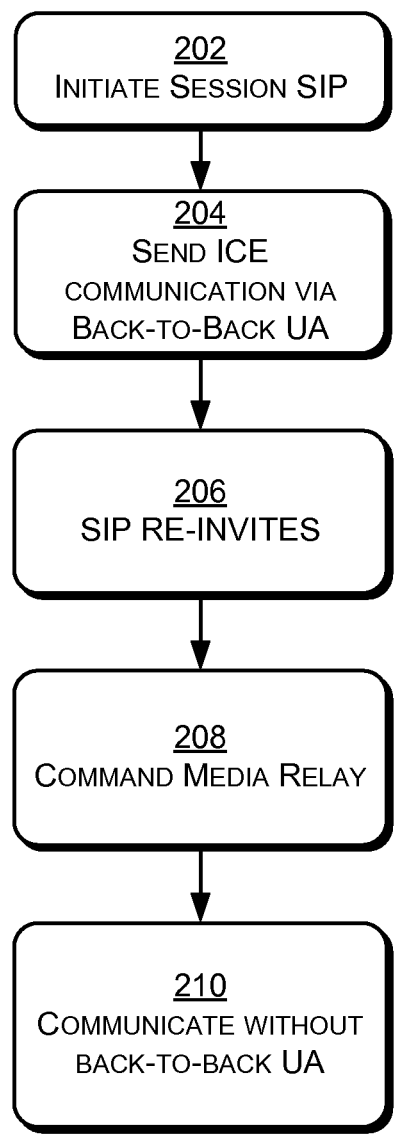
FIG. 2 is a flow diagram depicting a procedure in an exemplary implementation for commanding media relay communication establishment.

FIG. 2 discusses exemplary procedures for commanding media relay communication establishment. While exemplary environmental conditions are described, the techniques discussed herein may be used for a wide variety of situations involving legacy devices or non-ICE devices and various combinations and arrangements of NAT/firewall environments. In further instances, some devices may be public, or not included within a NAT/firewall.

A media communication between an ICE capable device (an ICE device) and a non-ICE capable device (i.e., a non-ICE device) may traverse a NAT and/or firewall boundary. For instance, an ICE communication (initiated via SIP 202) may pass through a media relay bridging the NAT boundary for the non-ICE device. The communication may flow to a back-to-back user agent 204 which handles the ICE aspects of the communication on behalf of the non-ICE device. For instance, one of the client agents in the back-to-back user agent may be ICE compliant and handle the ICE aspects of the communication, while another client passes content to the non-ICE device as if the communication were non-ICE. The back-to-back user agent may terminate connectivity test, transfer content and so on for the non-ICE device. Porting for the communication may be configured to "spoof" the non-ICE device for NAT binding and so on.

In embodiments, while the non-ICE device or other participants may issue SIP re-invites 206, the back-to-back user agent may issue a command 208 changing the state of the media relay so that communications flow between the media relay and the non-ICE device. Issuing a command 208 may override the media relay state which may not change as a result of one or more SIP re-invites. For instance, the command may force the media relay to direct communications to the non-ICE device, if the non-ICE device supports the communication. For example, the back-to-back user agent may test if the non-ICE device may handle media relay communications. By issuing a command, the back-to-back user agent may overcome the state of the media relay or the tendency of the media relay to direct communications to the back-to-back user agent. In further implementations, a corresponding command may be used for other communication participants or the media relay directed command may override the other participant's configuration. For example, the command may cascade to the non-ICE device and so on.

For example, while initial communications and associated signaling may flow through the back-to-back user agent, the back-to-back user agent command may change the state of the media relay so content is directed to the non-ICE device. In this manner, the command may overcome the media relay state which may direct the content to the back-to-back user agent. The resulting communication may not be ICE compliant or may be nominally ICE compliant as the set destination may be directed to a non-ICE device port, e.g., the back-to-back user may dictate the set destination to the non-ICE device. As a result, a non-ICE communication may be established over the ICE path without the back-to-back user agent passing content 210. For example, while ICE may allow for various potential candidates (e.g., the ICE candidate list), the back-to-back user agent may set the destination (in this case the target device side) to the non-ICE device port.

In implementations, the command may change the media relay input filter. For example, changing the media relay input filter may permit non-ICE device data input from being discarded by the input filter because the data is arriving from a source other than the expected port. The filter may prevent unauthorized or unintended sources from contributing to the communication.

Figure 3:
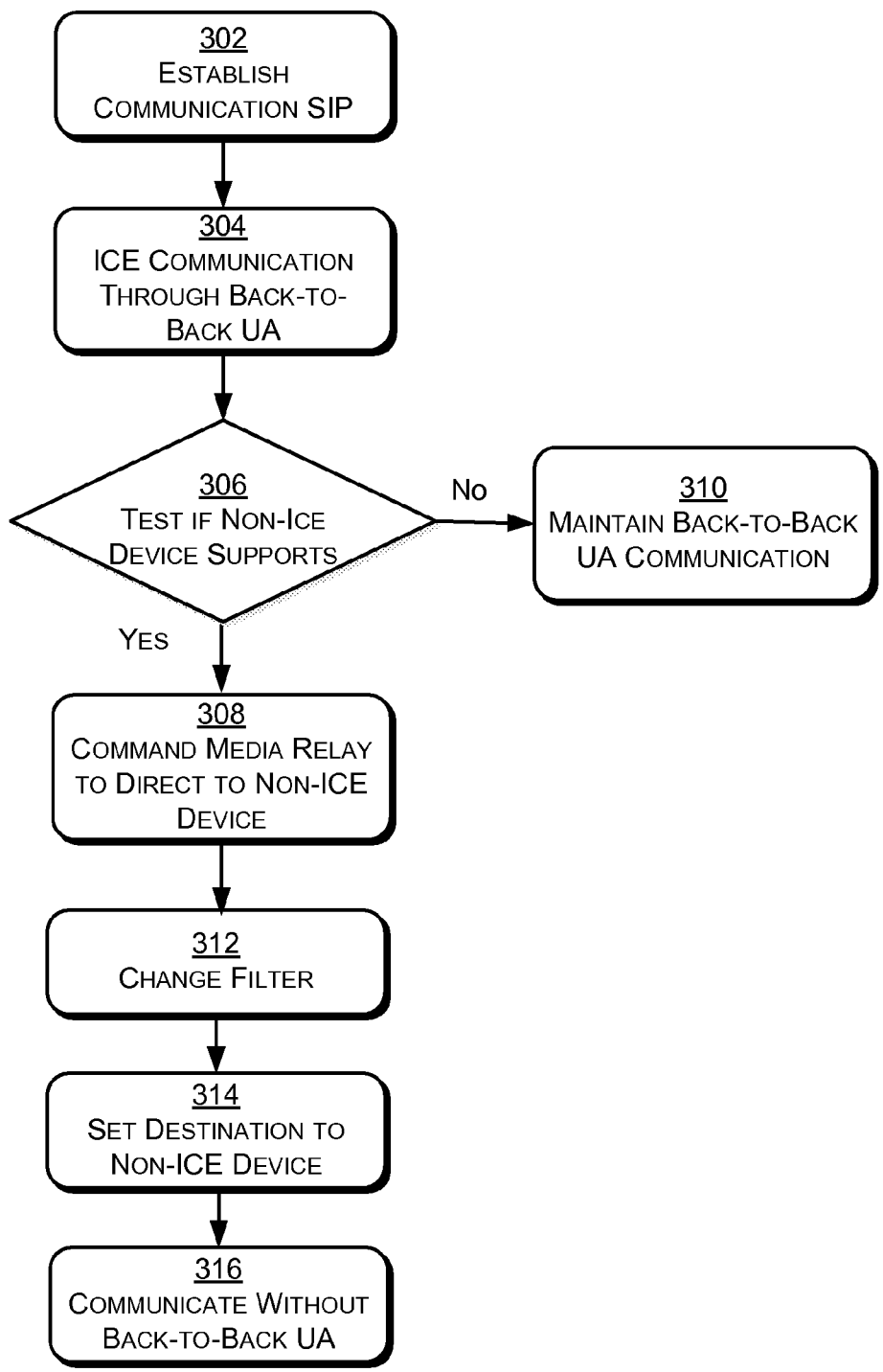
FIG. 3 is a flow diagram depicting a procedure in an exemplary implementation for commanding media relay communication establishment including overriding non-ICE devices.

FIG. 3 describes techniques for commanding media relay communication establishment including overriding non-ICE devices. The techniques discussed herein may be used in conjunction with SIP techniques in order to establish communication 302 between devices, including legacy devices which may not support ICE communication. While an ICE device initiated communication is discussed, in other instances, a non-ICE device may initiate communication, client devices may be involved in a multi-participant conference and so on.

As discussed previously, a media communication session may be initiated between multiple client devices which may include ICE devices and non-ICE devices which may be within firewall and/or NAT environments. Communications for non-ICE devices may be directed through a back-to-back 304 user agent which may handle the ICE specific aspects of the signaling/communication, such as providing a list of available addresses and so on. For example, if a VoIP session is initiated via SIP and ICE techniques, the communications may flow from a media relay (if the non-ICE device is within a NAT/firewall boundary) to the back-to-back user agent which may handle NAT binding and ICE connectivity tests on behalf of the subject non-ICE device.

The back-to-back user agent may act as an intermediary between the ICE enabled components and the non-ICE device. When establishing communication, some content may flow through the back-to-back user agent 304. If the non-ICE device is capable of supporting communications with the media relay, such as if non-ICE device responds positively to a back-to-back user agent test 306. If the the non-ICE device will support communication, or "Yes", the back-to-back user agent may command 308 the media relay to direct communications flowing to the back-to-back user agent to the non-ICE device. If the non-ICE device does not support communication with the media relay or directly to the remote client, the communication may continue over the back-to-back user agent 310.

The command may override the state of the media relay which may not change for a SIP re-invite issued by an ICE communication participant. For example, the command may force the media relay to send and/or receive communications from the non-ICE device in a subsequent non-ICE session. In examples, the command may change the media relay filter 312 to accept incoming communications from the non-ICE device. The command may also override the state of the non-ICE device, for example, if the non-ICE device is directing outbound packets to the back-to-back media relay. In this manner, the back-to-back user agent may change the configuration of the media relay (and non-ICE device) while avoiding a media relay resetting the configuration of the non-ICE device.

The back-to-back user agent may set the destination 314, within ICE procedures, to the address of the non-ICE device. For example, instead of selecting from a list of acceptable addresses, the back-to-back user agent may dictate the set address to that of the non-ICE device. If for example, the set destination would be set to a back-to-back user agent address during the course of ICE procedures when communication is flowing through the back-to-back user agent, the back-to-back user agent may set the destination to a port address on the non-ICE device. In this manner, the back-to-back user agent may not have to pass data for the remainder of the communication 316.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. A method comprising:
   routing, by a media relay, initial interactive connectivity establishment (ICE) communications with a non-ICE endpoint device as a destination to a back-to-back user agent, the back-to-back user agent receiving at least a content of the initial ICE communications and forwarding the content to the non-ICE endpoint device;
   using a command module of a communication device, subsequent to the forwarding of at least the content of the initial ICE communications to the non-ICE endpoint device by the back-to-back user agent, issuing a first command to the media relay, the first command configured to cause the media relay to change the routing of at least subsequent ICE communications with the non-ICE endpoint device as the destination such that the media relay redirects the subsequent ICE to redirect communications that, prior to the change caused by the first command, were to be routed to the back-to-back user agent to the non-ICE endpoint device such that the media relay forwards at least the content of the subsequent ICE communications to the non-ICE endpoint device, wherein the first command changes a state of the non-ICE endpoint device so that the non-ICE endpoint device communicates with an interactive connectivity establishment (ICE) endpoint device initially providing communications through the back-to-back user agent; and
   issuing a second command to force the media relay to forward at least the content of the subsequent ICE communications to the non-ICE endpoint device rather than through an ICE client in the back-to-back user agent.

2. The method as described in claim 1, wherein the back-to-back user agent receives an ICE candidate list.

3. The method as described in claim 1, wherein the method is session initiated protocol (SIP) compliant.

4. The method as described in claim 1, wherein the first command changes an input filter to a non-ICE device port.

5. The method as described in claim 1, wherein the first command sets the destination of the media relay to a non-ICE device port.

6. The method as described in claim 1, wherein a media relay state change occurring due to the first command at least in part overrides a state of the non-ICE endpoint device.

7. The method as described in claim 1, further comprising re-inviting an ICE device to a non-ICE session, when the non-ICE endpoint device is not within a network address translation (NAT) boundary.

8. One or more computer-readable memory devices comprising computer-executable instructions that, when executed, direct a computing system to:
   receive, by a back-to-back user agent, initial interactive connectivity establishment (ICE) communications with a non-ICE endpoint device as a destination routed to the back-to-back user agent by a media relay, the back-to-back user agent receiving at least a content of the initial ICE communications and forwarding the content to the non-ICE endpoint device;
   subsequent to the forwarding of at least the content of the initial ICE communications to the non-ICE endpoint device by the back-to-back user agent, issue a first command to the media relay, the first command configured to cause the media relay to change the routing of at least subsequent ICE communications with the non-ICE endpoint device as the destination such that the media relay redirects the subsequent ICE communications that, prior to the change caused by the first command, were to be routed to the back-to-back user agent to the non-ICE endpoint device such that the media relay forwards at least the content of the subsequent ICE communications to the non-ICE endpoint device, in response to which the media relay overrides a state of the non-ICE endpoint device; and
   issue a second command to force the media relay to forward the subsequent ICE communications to the non-ICE endpoint device rather than through an ICE client in the back-to-back user agent.

9. The one or more computer-readable memory devices as described in claim 8, wherein the first command changes a media relay input filter to a non-ICE device port.

10. The one or more computer-readable memory devices as described in claim 8, wherein the first command sets the destination of the media relay to a non-ICE device port.

11. The one or more computer-readable memory devices as described in claim 8, further comprising that, when executed, direct the computing system to initiate the ICE communication using session initiated protocol (SIP).

12. The one or more computer-readable memory devices as described in claim 8, wherein the back-to-back user agent issues either the first or the second command or both.

13. A system comprising:
   a back-to-back user agent device, including an interactive connectivity establishment (ICE) user agent, the back-to-back user agent device receiving initial ICE communications with a non-ICE endpoint device as a destination routed to the back-to-back user agent device by a media relay, the back-to-back user agent device receiving at least a content of the initial ICE communications and forwarding at least the content to the non-ICE endpoint device,
   the back-to-back user agent device configured to:
      subsequent to the forwarding of at least the content of the initial ICE communications to the non-ICE endpoint device, issue a first command to the media relay, the first command configured to cause the media relay to change the routing of at least subsequent ICE communications with the non-ICE endpoint device as the destination such that the media relay redirects the subsequent ICE communications that, prior to the change caused by the first command, were to be routed to the back-to-back user agent device to the non-ICE endpoint device rather than through the ICE user agent in the back-to-back user agent device.

14. The system as described in claim 13, wherein the first command changes a state of the non-ICE endpoint device so that the non-ICE endpoint device communicates with an interactive connectivity establishment (ICE) endpoint device providing the initial ICE communications initially routed through the back-to-back user agent device.

15. The system as described in claim 13, wherein the back-to-back user agent device receives an ICE candidate list.

16. The system as described in claim 13, wherein the first command changes an input filter to a non-ICE device port.

17. The system as described in claim 13, wherein the first command sets a destination of the media relay to a non-ICE device port.

18. The system as described in claim 13, wherein a media relay state change occurring due to the first command at least in part overrides a state of the non-ICE endpoint device;
   the back-to-back user agent device further configured to:
   issue a second command to force the media relay to forward at least the content of the subsequent ICE communications to the non-ICE endpoint device rather than through the ICE user agent in the back-to-back user agent device.

* * * * *